April 12, 1932.  G. B. RULLMAN  1,853,458
STATION INDICATOR
Filed Sept. 29, 1930    4 Sheets-Sheet 1
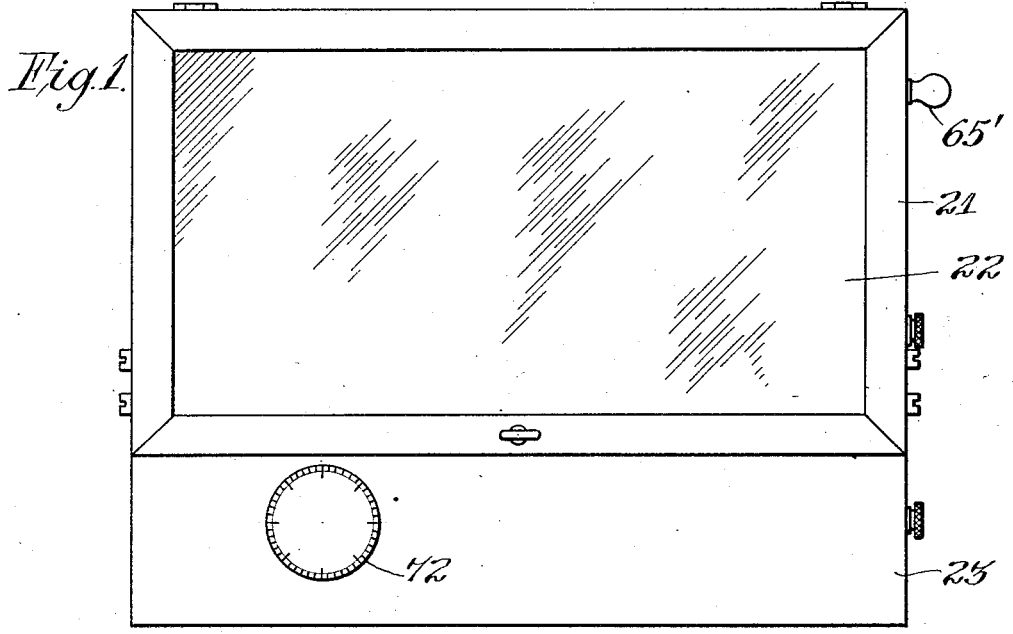
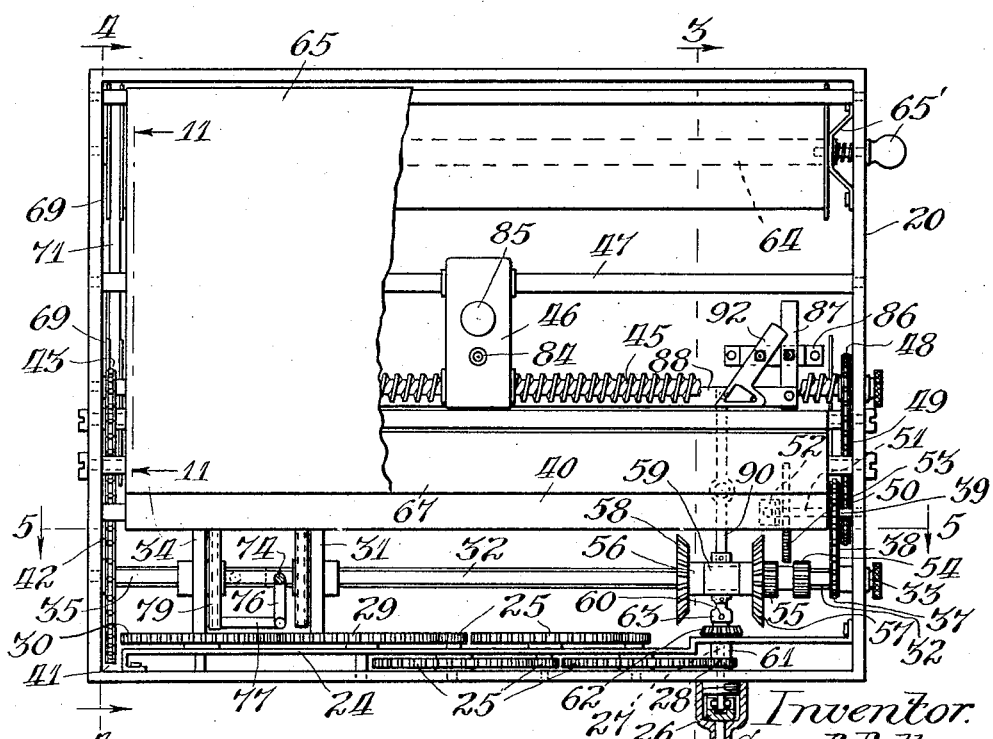
Inventor.
George B. Rullman,
By Paul O. Pippel
Atty.

April 12, 1932.    G. B. RULLMAN    1,853,458
STATION INDICATOR
Filed Sept. 29, 1930    4 Sheets-Sheet 2
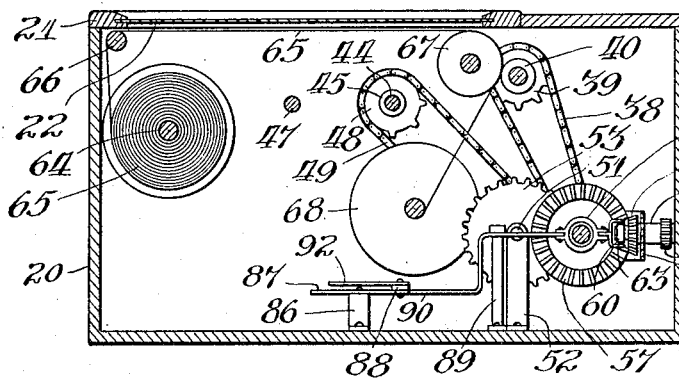
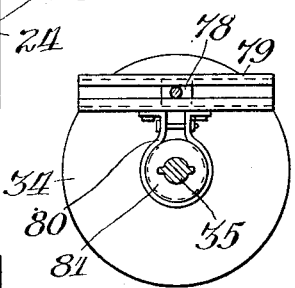
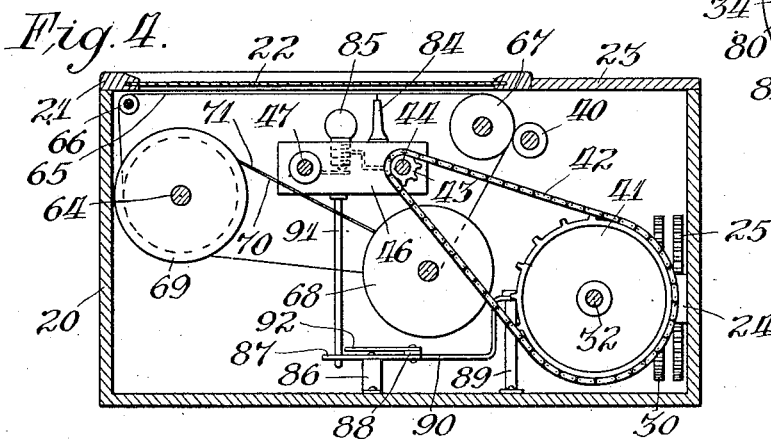
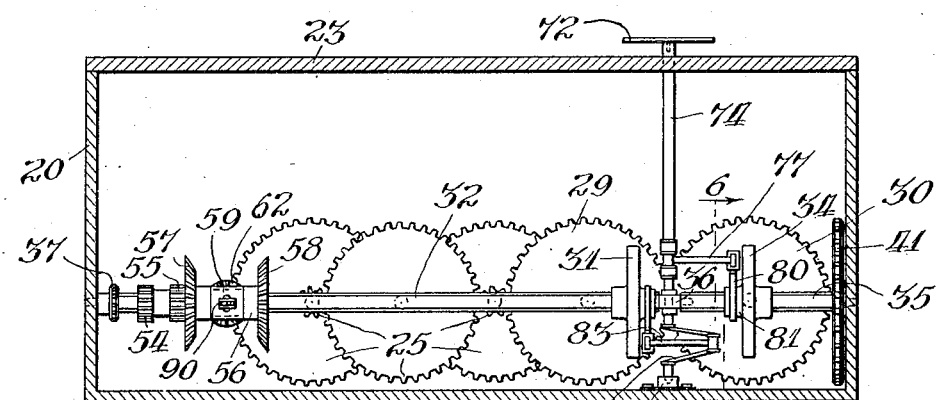
Inventor.
George B. Rullman,
By Paul O. Pippel
Atty.

April 12, 1932. G. B. RULLMAN 1,853,458
STATION INDICATOR
Filed Sept. 29, 1930   4 Sheets-Sheet 3
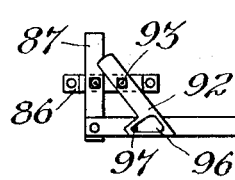
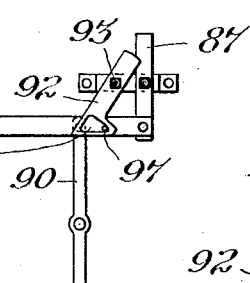
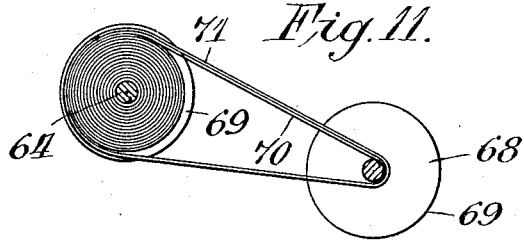
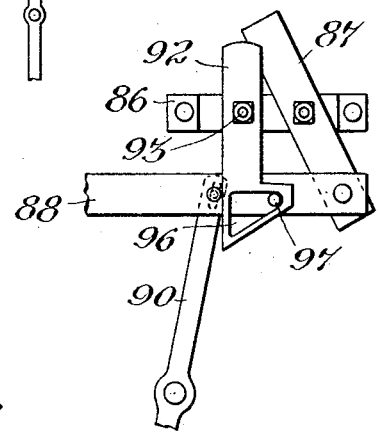
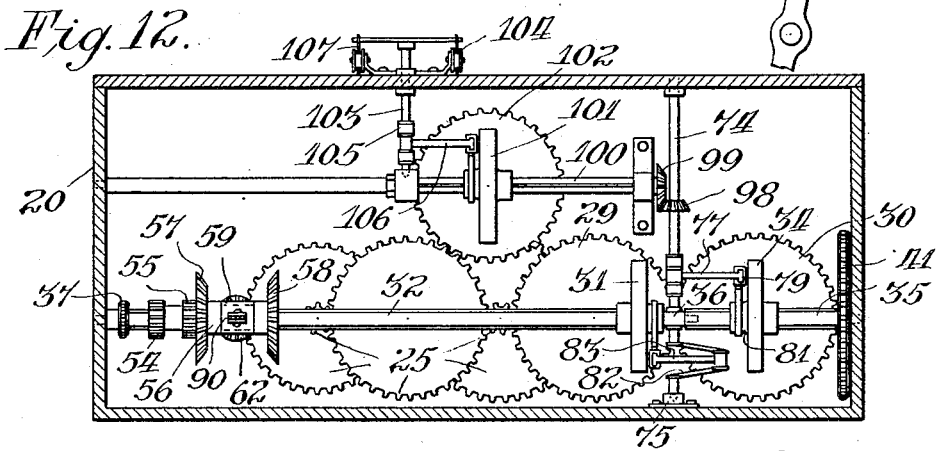
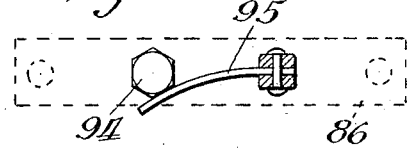
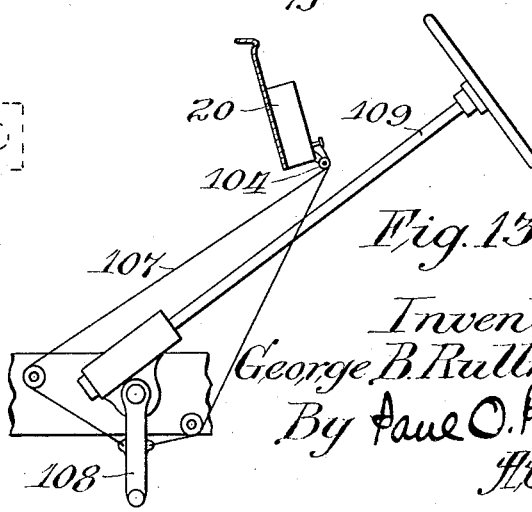
Inventor:
George B. Rullman
By Paul O. Pippel
Atty.

April 12, 1932. G. B. RULLMAN 1,853,458
STATION INDICATOR
Filed Sept. 29, 1930 4 Sheets-Sheet 4
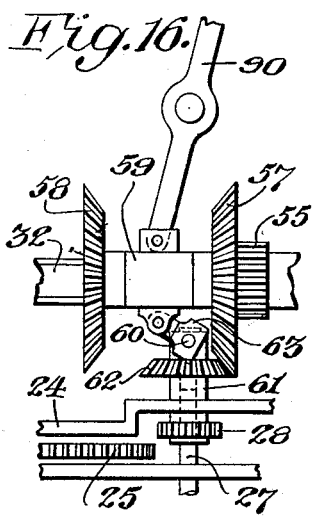
Fig.16.
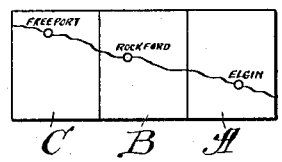
Fig.15.
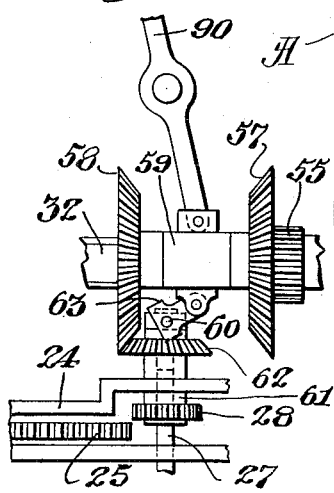
Fig.17.
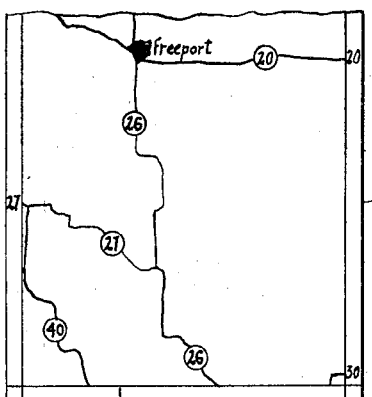
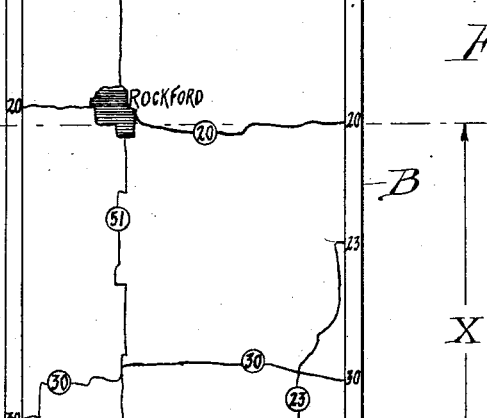
Fig.14.
INVENTOR.
George B. Rullman,
By Paul O. Pippel
ATTORNEY Patented Apr. 12, 1932

1,853,458

UNITED STATES PATENT OFFICE

GEORGE B. RULLMAN, OF ELMHURST, ILLINOIS

STATION INDICATOR

Application filed September 29, 1930. Serial No. 485,074.

This invention relates to station indicators and route recorders for use with various traveling conveyances such for example, as automobiles, aeroplanes, and boats.

When traveling in any of such motor vehicles it is desirable for the traveler to know at any instant the exact location of his vehicle, and to have such station or location indicated to him on a map. Still further it is highly desirable that a permanent record of a trip be made by delineating the route traveled on a map, whereby such marked map may serve as a record and memento of the trip.

Accordingly, the primary object of the invention is to provide an improved station indicator and route marker for use with vehicles or conveyances of the kind mentioned, such device to be entirely automatic in operation, after being initially set at the commencement of a trip, and foolproof and accurate in its designation of station and recording of the route.

Another object is to propel a map and pointer relatively to each other in syncronization with the rate of travel and in accordance with turning movements of the vehicle so that the map and pointer must at all times designate the station of the vehicle irrespective of changes in direction of travel, or variations in speed.

Still another object is to provide automatically acting means to shift into view a new section of map about to be traveled when an old section of map has been completely traversed and the indicator has run off the same, said means further acting to start off the indicator at the proper point on the newly presented map section, so that the action of indicating location and/or recording route will be continuous.

A further important object is to provide a box to enclose the device, such box to have a sight opening adjacent which the map and indicator travel, there being a light traveling with the indicator so that the pointer in its relation to the map will always be apparent or visible.

Other important objects not necessary to recite at this time will become apparent to those skilled in this art as the description progresses.

Briefly, these desirable objects will be accomplished by the embodiments of the invention herein illustrated, which it is to be understood, have been selected merely by way of example. In the main embodiment, a box is provided in a convenient place, for example on the instrument panel of a motor vehicle, such box having a glass covered sight opening beneath which is carried a strip map preferably translucent and formed in blocks or sections, each covering a predetermined section of territory that is to be traversed by the vehicle. Transmission mechanism is located in the box and geared preferably to the speedometer drive of the vehicle to cause movement of the map in syncronization with the rate of travel of the vehicle. This transmission mechanism is controlled in a manner by means to be fully described later, which means automatically drives the map forwardly or in reverse. Further a pointer, which may be a recording stylus, also is driven to move laterally in either direction beneath the map, said pointer in its movements being accompanied by a traveling light so that the pointer is at all times visible through the translucent strip map. The transmission includes trip mechanism functioning when the pointer travels off the edge of a map section, to operate the transmission mechanism in such a manner that it will automatically bring the next section of the map to be traveled into view, and also to reverse the pointer and locate it at the proper starting point on the new section of map to be traversed. So much will suffice in giving an introductory brief view of the invention.

In the drawings are illustrated forms which the invention may assume in practice. Like characters of reference designate similar parts throughout, and in these sheets of drawings, Figure 1 is a general, top plan view of a form of automatic location indicator and route recording device;

Figure 2 is another top plan view with the cover plate removed and a portion of the map and apparatus cut away better to illustrate the operating mechanism therebeneath;

Figure 3 is a vertical, cross sectional view through the box as seen along the line 3—3, appearing in Figure 2, when viewed in the direction of the arrows;

Figure 4 is another vertical, cross sectional view through the box as seen along the line 4—4, appearing in Figure 2, when viewed in the indicated direction;

Figure 5 is a vertical, longitudinal sectional view through the box and mechanism as seen along the line 5—5 in Figure 2, when viewed as shown by the arrows;

Figure 6 is an elevational view of a detail, as seen along the line 6—6 of Figure 5 when looking in the designated direction;

Figure 7 is a detail view, in top plan, showing a trip operated control mechanism for bringing a new map section into view;

Figure 8 is an enlarged detail view of one end of the showing of Figure 7, with the parts assuming a changed relative position;

Figures 9 and 10, are respectively top and side detail views, partly in section, showing a releasable lock mechanism which cooperates with the map changing control means;

Figure 11 is a detail, side elevational view, partly in section, as seen along line 11—11, appearing in Figure 2, the view showing mechanism to prevent the formation of slack in the map as it is wound back and forth about its rollers;

Figure 12 is a view, similar to Figure 5, but showing a modified form of direction control articulated with the steering control of a motor vehicle;

Figure 13 is a diagrammatic side elevational view to show the manner in which the device of Figure 12 may be associated with the steering mechanism of a motor vehicle;

Figure 14 is a plan view of the special strip map to be used with the indicator and/or recorder device of this invention;

Figure 15 is a much reduced, detail view to illustrate the manner in which the special map may be developed; and Figures 16 and 17 are detail views, in plan, showing the operation of a portion of the gearing.

One practicable form of the invention has been shown in Figures 1-5 inclusive, wherein the station indicator and/or route marker has been constructed for use with an automobile, the power for operating the driving mechanism thereof being derived from the usual speedometer drive, and a strong compass being utilized as a control element to shift the map and pointer relatively to each other in accordance with deviations in the course traveled by the vehicle.

First of all, a box 20 is provided to enclose the map and operating mechanism, said box in any appropriate and convenient manner being located on the usual instrument panel or other convenient location inside the cab or body of the vehicle as shown in Figure 13. The top of the box is provided with a hinged cover 21, which includes a glass, or other transparent panel 22 serving as a sight opening for inspection of the map which travels thereunder, as will later be described. One end of the top includes a cover part 23 which is made fast to the walls of the box as shown in Figure 1.

Inside the box the bottom wall carries a vertical plate 24 (see Figure 2) said plate cooperating with the adjacent box wall to journal and support short stub shafts that carry a train of speed reducing gears 25. A drive coupling 26 is provided in the manner shown for connection to the vehicle speedometer drive in any appropriate manner, said coupling turning a shaft 27 on which is splined for fore and aft sliding movement axially of the said shaft, a spur gear 28 adapted normally to be in mesh with the first gear of the gear reducer train 25. This train of gearing 25 terminates in two meshed large gears 29 and 30, each of which have friction faces for a purpose now to appear. The friction face of gear 29 is contacted by a friction wheel 31 splined for sliding movement on a splined cross shaft 32 that has its end carried in a journal bearing 33 mounted in an end wall of the box. The other friction faced gear 30 contacts drivingly with a friction wheel 34 similarly splined for sliding movement on a short length shaft 35 which has its free end appropriately journaled in the adjacent end wall of the box. These two splined shafts 32, 35 are coaxially arranged and have their inner adjacent ends suitably supported by a coupling device or member 36, see Figure 5, which member 36 is non-rotatable but permits the shafts 32, 35 to have independent turning movements relative to each other and in opposite directions, if occasion requires.

The outer end of the shaft 32 adjacent the side wall of the box carries fixedly thereon a small sprocket wheel 37 around which is a chain 38 that drives another sprocket wheel 39 made fast with a rubber or similarly covered driving roller 40 for driving the map, as will later more clearly appear. The outer end of the other shaft 35 similarly carries a fast sprocket wheel 41 to drive a chain 42, see also Figure 4, said chain being trained around a small sprocket wheel 43 made fast to a cross shaft 44 having its ends suitably journaled in the box ends as best appears in Figure 2. On this cross shaft 44 which is parallel with the shafting 32, 35 is formed a continuous screw 45 onto which is threaded a traveling nut or block 46, said block being also slidably carried by a cross rod 47 to guide its to and fro movements and prevent rotation of the nut, it being understood that the ends of the guide rod are carried in the side walls of the box, as shown.

As appears best in Figure 2, the right hand end of the screw shaft 44 carries a fast sprocket wheel 48 (see also Figure 3) to drive a chain 49 which in turn drives a sprocket wheel 50 made fast to drive a short crosswise countershaft 51 having one end journaled in a standard 52 rising from the floor of the box, while the other end of said countershaft is carried rotatably by the adjacent side wall of the box in the manner shown. This countershaft 51 drives a relatively large spur gear 53 which in the position of the parts shown in Figure 2 runs between a small gear 54 and another gear 55 of the same size, said gears being unitary with a sleeve 56 slidably mounted on the shaft 32 already described. Said sleeve, to the left as viewed in Figure 2, is enlarged and carries two oppositely faced, large bevel gears 57, 58. Thus, it will be understood that the gears 54, 55, 57 and 58 constitute a unit all formed with the sleeve 56 to be slidable therewith along the shaft 32. A shifter member for this gear unit is provided in the form of a collar 59 loosely surrounding the sleeve 56, said collar having a socket 60 serving as a thrust support for the drive shaft 27 which is carried in a wall of the box and by the plate 24. It is to be here noted that this shaft 27 carries a slidably mounted sleeve 61 (see also Figure 3) which sleeve carries the drive gear 28 heretofore described, as well as a bevel pinion 62 adapted at times to mesh with either the bevel gear 57 or the bevel gear 58 in a manner later to be described. See Figures 16 and 17. To cause such gear engagement a yoke 63 is carried appropriately by the collar 59, said yoke engaging the sleeve 61 as desired to move the gear 62 into or out of mesh with either gear 57, 58. The mechanism that causes this action will be described presently.

At the top forward end of the box is mounted a rotatable roller or spool 64, one end of a ribbon or strip map 65 being made fast thereto in any preferred manner. Such roller 64 will be mounted in the box by any suitable form of detachable coupling indicated at 65′ to permit of ready removal of the roller and map for such reasons as replacing the map with another, etc. This map is then trained around an idler roller 66 to cause the map to run closely against and under the sight panel 22 of the box. Next the map is trained over a roller 67 (see Figures 3 and 4) also serving to keep the exposed run of the map adjacent the sight panel. It is here to be noted that this roller 67 will be faced with rubber or a similar material because this roller functions to prevent map slippage by maintaining said map tightly against and between the said two rubber faced rollers. The map ribbon then runs between these driving and driven rollers 40, 67 to another storage roller 68 located centrally toward the bottom of the box, said map having its other end anchored to this latter roller. The roller 68 may be mounted in the box for quick removal therefrom in the same manner as described in connection with the other storage roller 64. This map will be driven to run in either direction and therefore it is highly important that means be provided to prevent the formation of slack in the map. Such means will now be described.

Looking at Figures 2 and 11 it is to be noted that the left hand end of each storage roller as appears in these drawings is provided with a flanged wheel 69 formed as a part of each storage roller. Having its ends respectively anchored to these flanged guide wheel parts is a narrow band 70 of the same length as the map, the said band being of the same thickness as the map so that when it runs with the map on the rollers, the narrow band will wind up on its flanged wheel part exactly the same number of turns and to the same thickness or height as the map on the storage rollers. A rubber band 71 of endless form is in engagement with the slack preventing band 70 and is trained over the band 70 around the roller guide parts 69. By this means a tension is created on the band 70 and as the map runs with the said band 70 no slack can form in the map and as a result the map at all times must be wound tightly and evenly on its storage rollers.

As has been stated, the map 65 is driven from the drive roller 40 chained to the shaft 32. As the map must be driven ahead at times and backwardly at other times, it is necessary to provide means controlled by the direction of travel of the vehicle to cause the drive shaft 32 to be reversibly driven in either direction. For this purpose a strong compass indicated by the diagrammatic compass card 72 may be provided carried on the box top 23 as appears in Figures 1 and 5. The compass 72 is made fast to a vertical shaft 74 projecting downwardly, the same passing loosely through the non-rotatable coupling 36, heretofore described, and having its bottom end resting on a pointed turn bearing 75 carried by the bottom of the box. Above the coupling 36 the vertical compass shaft is formed with a fast crank 76 to which is attached a connecting rod 77, said rod terminating in any appropriate form of block 78 (see Figure 6) mounted for sliding movement in a fore and aft extending horizontal channel guide 79. This guide is secured to a collar 80 turnably mounted in a groove formed in the hub 81 of the friction wheel 34. Similarly a crank 82 is formed on the compass shaft 74 beneath the coupling 36, said crank having a connecting rod 83 similarly associated with the other friction wheel 31. Obviously now any change in direction of travel of the vehicle which deviates from a northerly compass direction will cause a relative movement of the cranks which lengthens or shortens, in effect, the connecting rods 77, 83 and as a result the friction wheels 31, 34 will automatically be slid along their respective shafts, to which they are slidably keyed it will be remembered, thereby moving said friction wheels 31, 34 with respect to the cooperating friction driving wheels 29, 30. For example, if the wheel 31 is to one side of the center gear wheel 29, then the shaft 32 will be driven in one direction. Conversely, if the wheel 31 shifts to the other side of the center of the wheel 29, then the shaft 32 will be driven in the opposite direction.

Similarly, under the action of the compass control, the wheel 34 is shiftable relatively to the wheel 30 to drive the shaft 35 ahead or reverse, whereby the screw shaft 44 may be reversely driven to cause the nut 46 to shift automatically from left to right to locate a pointer or marker 84 carried by the nut 46 properly relative to the map. This pointer appears as a visible dot or marker beneath and through the translucent map. If it is desired to make a permanent record on the map of the route traversed, then the pointer 84 will assume any appropriate form of marking stylus in an obvious manner. So that the marker may be better observed, a small electric lamp 85 is mounted on the nut 46 to travel therewith. Such lamp may in any well known manner be suitably connected in circuit with the usual electric storage battery carried by the vehicle.

If the marker or pointer 84 should in accordance with the direction of travel run off one lateral edge of the map, it is important to bring a new section of map representing a continuation of the course to be followed, into view beneath the sight opening, and to reverse the position of the marker or pointer to start the same off properly at the right point of such new section of map. Accordingly means is provided automatically to display new map sections and to relocate the pointer on such newly displayed map section. For this purpose a novel form of map has been devised for use with the location marking device of this invention. Deviating for a moment, this map will next be described.

Referring to Figure 15 there is illustrated a conventional form of strip map delineating a route to be followed through Elgin, Rockford and Freeport, by way of example. To carry out this invention, such strip map will be divided into equally sized rectangular blocks A, B and C. These blocks are then severed from each other and arranged after the fashion illustrated in Figure 14 where a strip of completed map is indicated generally by the character 65. The starting point Elgin, falls in section A and therefore it has been placed at the bottom; then above section A is placed the next section, B; and, above section B is placed section C and so on to form a continuous length of strip map. Thus with the marker starting at the lower right hand end of section A, if the stated road is traversed, the map and indicator move relatively with the pointer delineating the Elgin road, marked 20 in a circle until the marker 84 runs laterally to the left off section A. By trip mechanism to be described presently, the map is moved to bring the next section B into view and the pointer 84 is quickly shifted to the right to start on the right hand end of the continuation of the stated road. In a similar manner the pointer will be shifted to the proper route on section C when section B has been completely traversed. To accomplish this, the map sections A, B and C are made of a vertical length, as viewed in Figure 14, equal in length to the length of a vertical line between the take off point on section A to the starting point on section B. In other words in Figure 14 distance X equals distance Y.

The trip mechanism for reversing the postion of the marker 84 from one extreme side postion to the other, and vice versa, is illustrated clearly in Figures 2, 7, 8, 9 and 10. The box bottom carries a support 86 (see also Figures 3 and 4) at each side, each support pivotally carrying a trip lever 87 the bottom ends of said levers carrying pivotally connected thereto, a connecting cross trip bar 88. A standard 89 pivotally supports a lever 90 which is pivoted intermediately of its ends so that its one free end can be pivotally connected to the cross bar 88, while its opposite free end is pivotally connected to the shifter collar 59, heretofore described. Extending downwardly from the traveling nut 46 is a kicker arm 91. Now it can be appreciated when the nut travels to the extreme left hand postion with the pointer 84 about to jump off the left hand end of a map section, that the kicker arm 91 will strike the left hand lever 87 (Figure 7) to pivot the same on its support, whereupon the bar 88 must shift to the right (Figure 8) to move lever 90 in the manner shown. As a result, the gears 62 and 28 which are tied together, slide to unmesh gear 28 from the gear train 25 and to mesh bevel gear 62 with bevel gear 57. See Figure 16. Therefore the drive goes through gears (Figure 2) 55, 53, shaft 51, chain 49 to screw shaft 44 thereby reversing the nut 46 and causing it to travel to the other side. Simultaneously, the map is driven from chain 38 to bring the next section of map into view and as a result the map and marker have been moved relatively to each other to start the pointer 84 at the starting point at the right hand edge of the map. This control mechanism also includes a lever 92 pivotally carried by depending shafts 93 on the supports 86, one at each side. The lower ends of these shafts, as at 94, are squared to be engaged by a flat spring 95, suitably mounted, to form a releasable detent lock temporarily to hold the cross bar 88 against shifting movement until the nut 46 has been driven completely back to its new starting postion, whereupon the kicker 91 engages the right hand lever 92 to pivot the same. These levers 92 have eyes 96 surrounding a pin 97 carried at each end of the cross bar 88. Obviously now, when the lever 92 is pivoted, as just described, the eye 96 must pull the bar 88 through a pin 97 back to the left. The detent lock 94, 95 reelases now to permit such movement. This action then returns all control parts to the position shown in Figures 7 and 2 where the gear 28 once more is meshed with the gear train 25.

In Figures 12 and 13 the structure is identical except that the compass control is eliminated and a steering gear control is substituted in its place. Accordingly, in these figures the crank shaft is not compass controlled, but carries a gear 98 moved by a gear 99 on a shaft 100. This shaft 100 carries a slidable friction wheel 101 meshed with a friction faced gear wheel 102 geared to one of the reducer gears 25. A vertical shaft 103 protrudes from the top of the box where is mounted a pulley wheel set 104. The shaft 103 carries a crank 105 and connecting rod 106 connected to move the wheel 101 relatively to wheel 102 in the same fashion as crank 76 and rod 77 cause movement of the wheel 34 as heretofore described. Next the pulley set 104 is connected with cables 107 appropriately connected in the desired manner with the steering arm 108 of a conventional motor vehicle steering apparatus 109. Thus, turning movements of the vehicle cause control of the drive mechanism just as in the case of the compass control.

In operation the rollers in the box will carry the proper map, constructed in sections as described, for the trip intended, it being understood that at the beginning the map and pointer will be properly set relatively to each other. The vehicle now moves and its speedometer drive through the gearing described propels the map in proper timing to the speed of travel, while at the same time the pointer 84 moves back and forth relatively to the map as will be occasioned by turning movements of the vehicle.

When one section of map has been completely traversed, as described, a new map section is automatically displayed, and the pointer is reversed in position and automatically moved relatively, with the new map displayed to start the marker off at the right point on the new map.

The marker as has been described, may be a recording stylus, and in its travel to and fro will always be illuminated because the traveling nut carrying said marker, also carries a light.

Obviously, this invention is useful in connection with other types of conveyances, such as aeroplanes and boats, for the device always will indicate the station of the vehicle on a map at any instant and further, if desired, may be used to make a permanent record of a route traversed. Thus, the device is a great aid in maintaining a course of travel.

Herein, the term vehicle is used in the broadest sense as including any kind of traveling conveyance, such as ground vehicles, boats, or aeroplanes.

It is the intention herein to cover all such variations and departures from the selected examples herein chosen by way of illustration only, as do not depart from the spirit and scope of the invention, which is defined in the following claims.

What I claim is:

1. In an indicator, a map formed in sections as a ribbon, a marker, means for moving the map and marker relatively to each other, and automatically acting means to reverse the position of the marker in the event it runs off one section of map and to shift a new section of map into place with respect to the changed position of the marker to designate the location of the vehicle.

2. In an indicator, a map formed in sections as a ribbon, a traveling nut carrying a marker, means for moving the map and marker relatively to each other, trip means controlled by the nut, and means set into operation by the trip means when the marker runs laterally off one section of map automatically to display a new section of map and to move the marker to indicate the position of the vehicle on such newly displayed map section.

3. In an indicator, a map formed in sections as a ribbon, a traveling nut carrying a marker, a main gear set for driving the map and marker relatively to each other, trip means controlled by the nut, and a second gear set set into operation by the trip means to drive the map and nut when the marker runs laterally off one map section, said second gear set acting to shift the nut to the opposite side and bring a new section of map into position where the indicator will show the position of the vehicle thereon.

4. In an indicator for vehicles, a box, a roller mounted ribbon map formed in sections and arranged in said box, reduction gearing in the box including friction wheels, means for driving the map rollers from said reduction gearing, a traveling nut carrying an indicator, means for driving the nut from the reduction gearing whereby the map and marker are shifted relatively to each other, means including cranks acting to reverse the drive to the nut and map through said friction wheels upon a change in direction of travel of the vehicle, means for driving the reduction gearing in timed relation to the speed of travel of the vehicle, trip means controlled by the nut, and means set into operation by said trip when the marker runs laterally off one section of map to cut out the reduction gear drive to the map and nut and to drive the map and nut reversely to bring into indicating position a new section of map and to relocate the marker to cause the same to indicate the station of the vehicle on such newly displayed map section.

5. In an indicator for vehicles, a box having a sight opening, a translucent map movable beneath said opening, means carrying a marker movable below the map, and a lamp carried by said means to travel therewith.

6. In an indicator, a map formed in sections as a ribbon, a marker, means for moving the map and marker relatively to each other in rectilinear lines, and means to reverse the positon of the marker in the event it runs off one section of map and to shift a new section of map into place with respect to the changed position of the marker to designate the location of the vehicle.

7. In a location indicator, a translucent map formed in sections as a ribbon, an illuminated marker disposed beneath the map, means to move the map and marker relatively to each other in rectilinear paths, and means to reverse the position of said marker in the event it runs laterally off one section of the map and to shift a new section of the map into place with respect to the changed position of the marker to designate the location of a vehicle carrying the indicator.

8. In a location indicator for a vehicle having speedometer drive mechanism, said indicator comprising a translucent map formed in sections as a ribbon, a marker disposed beneath the map to be visible therethrough, means operatively connected with the speedometer drive mechanism to move the map and marker relatively to each other in rectilinear paths, and means to reverse the position of the marker in the event it runs laterally off one section of the map and to shift a new section of the map into place with respect to the changed position of the marker to designate the location of the vehicle.

9. In an indicator, a map formed in sections as a ribbon, a rotatable screw shaft beneath the map, a traveling nut on the shaft carrying a marker, means for moving the map and marker relatively to each other, trip means engageable by the nut at the limits of its travel, and means set into operation by the trip means when the marker runs laterally off one section of map to display a new section of map and to move the marker to indicate the position of a vehicle carrying the indicator, on such newly displayed map section.

10. In an indicator for a vehicle having a speedometer drive, a map formed in sections on a ribbon, a rotatable screw shaft, a traveling nut on the shaft carrying a marker, a main gear set driven from the speedometer drive for driving the map and marker relatively to each other in rectilinear lines, trip means engageable by the nuts at the limits of its travel, and a second gear set moved into operation by the trip means to drive the map and nut when the marker runs laterally off one map section, said second gear set acting to shift the nut to the opposite side of its shaft and to bring a new section of map into position where the indicator will show the position of the vehicle thereon.

11. In an indicator for vehicles, a box, a roller mounted translucent ribbon map formed in sections and arranged in said box, reduction gearing in the box including friction wheels, means for driving the map rollers from said reduction gearing, a traveling nut carrying an indicator beneath the map, means for driving the nut from the reduction gearing whereby the map and marker are shifted relatively to each other in rectilinear lines, means including cranks acting to reverse the drive to the nut and map through said friction wheels upon a change in direction of travel of the vehicle, means for driving the reduction gearing in timed relation to the speed of travel of the vehicle, trip means engageable by the nut at the limits of its travel, and means set into operation by said trip when the marker runs laterally off one section of map to cut out the reduction gear drive to the map and nut and to drive the map and nut reversely to bring into indicating position a new section of map and to relocate the marker to cause the same to indicate the station of the vehicle on such newly displayed map section.

12. In an indicator for vehicles, a box having a sight opening, a translucent map movable beneath said opening, means carrying a marker movable below the map, means causing the map and marker to move relatively to each other in rectilinear paths, and a lamp carried by said means to travel therewith.

GEORGE B. RULLMAN.